United States Patent Office 3,137,788
Patented June 16, 1964

3,137,788
ERROR CHECKING SYSTEM USING RESIDUE
REDUNDANCY
Robert Justin Froggatt, Southall, England, assignor to
Electric & Musical Industries Limited, Hayes, England,
a company of Great Britain
Filed Nov. 4, 1960, Ser. No. 80,964
4 Claims. (Cl. 235—153)

The present invention relates to apparatus for transferring, processing or otherwise handling information, such as, for example, computers or data links.

With the advent of on-line computing, that is to say, the use of electronic or other such computers for directly processing information from an active source such as chemical or nucleonic plant, the penalties of errors and breakdowns have become considerably more severe. The delay in processing will mean that the output information will not be available when required and that a considerable back log of data requiring processing will accumulate and will need to be stored.

Error detection arrangements using parity check digits are well known but in general these only indicate the existence of an error without being able to correct the error. Error correction systems using parity check digits have been devised but these are not capable of checking the arithmetic processes of a computer, as the validity of the check is destroyed by the process and new check digits have to be generated.

Errors may also be detected and corrected by carrying out the process a number of times, possibly in different ways, and comparing the results. This system has the disadvantage of either slowing down the calculation or of increasing the equipment required.

It is the object of the present invention to provide improved apparatus for handling information in which facilities are provided for checking the information, and for enabling the correct information to be determined despite the malfunctioning of part of the apparatus.

According to the present invention there is provided information handling apparatus adapted for handling numbers within a given number field, comprising input means for providing a plurality of remainder signals which represent an input number, each individual remainder signal representing the remainder after division of the input number by a divisor, and each divisor being prime relatively to every other divisor, the number of remainder signals being greater than the number sufficient to determine uniquely any number in said number field, means responsive to said signals to provide a plurality of output remainder signals equal in number to said input remainder signals and representing a number in said number field, and means for decoding said output remainder signals to indicate the number represented thereby, said decoding means including means for detecting an incorrect output remainder signal and for producing said indication without regard to such incorrect output remainder signal.

In a preferred form of the invention, the means for providing the remainder signals in response to an input number is arranged to provide two remainder signals in excess of the number which is sufficient to determine uniquely any number in the number field, and the decoding means comprises testing means responsive to different combinations of said output remainder signals, each combination having that number of remainder signals sufficient to determine uniquely any number in said number field, to select two combinations which determine the same number in said number field, thereby to indicate the correct output number. It will be understood that if the number of remainder signals is two more than the number sufficient to determine uniquely any number in the number field then there will always be two combinations of the remainder signals which are sufficient to determine a number in the number field and which do not include the incorrect remainder signal. Moreover these two combinations when decoded will indicate the same number and thus indicate the correct number. All other combinations since they include the incorrect remainder signal indicate different numbers.

In order that the invention may be fully understood and readily carried into effect, it will now be described with reference to the accompanying drawings, in which.

The invention is based on an application of a system of coding of numbers which is described in an article by Professor Svobda entitled "Rational Numerical System of Residual Classes," published in "Stroje Na Zpracovani Informaci" (Prague 1957). This system can be illustrated by considering two integers "$a$" and "$b$" which have the same remainder after division by the integer "$m$." Two such integers are said to be congruent to modulus $m$. This is written $$a \equiv b \pmod{m}$$

"$a$" and "$b$" are also said to have equal residues, the residue being the remainder after division by the modulus $m$, and, therefore, is a positive integer between 0 and $m-1$, inclusive.

Thus, a number may be represented by its residue to modulus $m$, but there are only $m$ unique representations possible.

If the residues of an integer N with respect to two moduli $m$ and $n$ are $p$ and $q$ respectively, then $$N \equiv p \pmod{m}; N \equiv q \pmod{n}$$

Thus we have an ordered pair of numbers $(p, q)$ representing N, and if $m$ and $n$ are relatively prime, then $m \times n$ unique representations are possible. Therefore the first $m \times n$ integers may be uniquely coded by the use of this ordered pair representation. The $m \times n$ integers which are coded in this way constitute a number field.

This method of coding may be applied to any integer by the use of as many relatively prime moduli as are necessary for their product to exceed the number to be coded. The representation is, of course, an ordered set of numbers, being the residues of the number to be coded with respect to the moduli. The code may be called the "remainder code."

In the case of the three smallest prime numbers, 2, 3 and 5, the largest number of integers which may be uniquely represented is 30, for example, the numbers 0 to 29.

| Number | Residue Mod. 5 | Residue Mod. 3 | Residue Mod. 2 |
|---|---|---|---|
| 0 | 0 | 0 | 0 |
| 1 | 1 | 1 | 1 |
| 2 | 2 | 2 | 0 |
| 3 | 3 | 0 | 1 |
| 4 | 4 | 1 | 0 |
| 5 | 0 | 2 | 1 |
| 6 | 1 | 0 | 0 |
| 7 | 2 | 1 | 1 |
| 8 | 3 | 2 | 0 |
| 9 | 4 | 0 | 1 |
| 10 | 0 | 1 | 0 |
| 11 | 1 | 2 | 1 |
| 12 | 2 | 0 | 0 |
| 13 | 3 | 1 | 1 |
| 14 | 4 | 2 | 0 |
| 15 | 0 | 0 | 1 |
| 16 | 1 | 1 | 0 |
| 17 | 2 | 2 | 1 |
| 18 | 3 | 0 | 0 |
| 19 | 4 | 1 | 1 |
| 20 | 0 | 2 | 0 |
| 21 | 1 | 0 | 1 |
| 22 | 2 | 1 | 0 |
| 23 | 3 | 2 | 1 |
| 24 | 4 | 0 | 0 |
| 25 | 0 | 1 | 1 |
| 26 | 1 | 2 | 0 |
| 27 | 2 | 0 | 1 |
| 28 | 3 | 1 | 0 |
| 29 | 4 | 2 | 1 |
| 30 | 0 | 0 | 0 |

It will be noticed that the code for 30 is the same as the code for 0, and it may easily be verified that the code for 30 $m+n$ is the same as the code for $n$, for all values of $m$, where $m$ and $n$ are integers.

Clearly, if $$N \equiv a \;(\mathrm{mod.}\; p)$$

and $$M \equiv b \;(\mathrm{mod.}\; p)$$

Then, provided that N, M and $N+M$ lie within the number field, i.e. as given by the product of the moduli:

$$(N+M) = (a+b) \;(\mathrm{mod.}\; p)$$

For example, $$7 + 12 = 19$$

$7 = 211$
$12 = 200$ in the 5, 3, 2 numbering system given above.
$19 = 411$ $211 + 200 = 411$ which is obviously true taking the residues for each modulus in turn, e.g. $2+2=4$, $1+0=1$, and $1+0=1$. This indicates that the addition of numbers coded in the "remainder code" can be added by separately adding the corresponding residues, each individual addition being carried out with respect to the appropriate modulus. Thus if, $a=b$ exceeds $p$, the residue after addition becomes $a+b-p$.

Subtraction may also be carried out provided that care is taken in the handling of negative numbers.

It will be noticed that there is no requirement to propagate carries except within each modulus channel where the carry chains are short.

Similarly, in the case of multiplication $$N \times M \equiv a \times b \;(\mathrm{mod.}\; p)$$

for example $$4 \times 7 = 28$$

$4 = 410$
$7 = 211$ in the 5, 3, 2 numbering system
$28 = 310$ $410 \times 211 = 310$ which may readily be verified by taking the residues for each modulus in turn, e.g.

$$4 \times 2 = 8 \equiv 3 \;(\mathrm{mod.}\; 5)$$

$$1 \times 1 = 1 \equiv 1 \;(\mathrm{mod.}\; 3)$$

$$0 \times 1 = 0 \equiv 0 \;(\mathrm{mod.}\; 2)$$

The apparatus illustrated in the drawing receives signals representing input numbers coded in binary decimal code at four input terminals 1, 2, 3 and 4, the input terminals corresponding respectively to binary digits $2^0$, $2^1$, $2^2$ and $2^3$. Signals representing different decimal characters of the input number are received in serial form, but the binary digits representing each of the decimal characters appear in parallel at the input terminals. The number field for the apparatus illustrated comprises the numbers zero, to 99,999 and five buffer stores 5, 6, 7, 8 and 9 are provided for storing respectively the binary signals representing the units decimal digits, the tens decimal digit and so on up to the ten thousands decimal digit. The correct buffer store is sensitised to receive the appropriate binary code signals by means of a ring counter 10 the operation of which is synchronised with the incoming signals, in any suitable manner. The construction of the buffer stores 5 to 9 and the ring counter 10 will not be described as they may follow well known binary digital computer practice, and do not in themselves form part of the invention. When an input number has been stored in the buffer stores 5 to 9 it is transferred in parallel to five remainder coding devices 11, 12, 13, 14 and 15, the transfer being effected under the control of the ring counter 10 in such a way that the binary signals representing the respective decimal characters arrive in the encoding devices in serial order, the units decimal digit being last and the ten-thousands decimal digit being first. The encoding device 11 is adapted to produce in a series of output conductor 16 a binary signal representing the remainder after the input number has been divided by 55. The conductors 16 are therefore said to constitute the "modulus 55" channel. Similarly the encoding devices 12, 13, 14 and 15 produce output binary signals in channels 17, 18, 19 and 20 representing respectively the remainders after the input number has been divided by 59, 61, 62 and 63. The channels 17 to 20 are therefore called the "modulus 59" "modulus 61" "modulus 62" and "modulus 63" channels. It will be observed that the moduli 55, 59, 61, 62 and 63 are all relatively prime, that is they have no common factor other than unity, although 62 is not itself a prime number. Moreover, any three of the remainders in the channels 16 to 20 is sufficient to determine uniquely any number in the number field of the apparatus since the product of the three smallest moduli is greater than 100,000. It is preferred to use relatively large moduli because any number in a large number field can then be determined uniquely by a relatively small number of remainders. Thus in the example being described any number in the number field can be determined uniquely by three of the remainders, and the other two residues are redundant, provided there is no malfunctioning in any modulus channel. However, if any one modulus channel should produce an incorrect output, the correct answer can yet be derived from the data handling apparatus by virtue of the provision of "redundant" channels.

The remainders produced by the encoding channels 11 to 15 may be in the range from zero to 54 in the case of the device 11 and from zero to 62 in the case of the device 15. Therefore these six binary digits are sufficient to encode any of the remainders in binary code, and consequently there are 6 conductors only in each of the channels 16 to 20. The channels 16 to 20 lead to respective buffer stores 21 to 25 and thence to respective elementary computers 26 to 30 in each of which the respective remainder may be manipulated in any desired way. The construction of the computers will not be described as each one of them may be a conventional binary digital computer subject only to the condition that each operates to the modulus of the respective channel. Thus the computer 26 operates to the modulus 55, the computer 27 operates to the modulus 59 and so on. Each elementary computer may for example comprise an arithmetic unit coupled with conventional storage and address selection facilities. Clearly, having regard to the relatively small moduli of the elementary computers each computer may be of relatively simple construction. The elementary computers all operate in unison and perform simultaneously the same operations although the modulus in each case is different. Therefore when the computers produce output signals the output signals from all the computers will correspond to the same answer number but will represent the remainders after that answer number has been divided by the respective moduli. Therefore, when the computers produce output signals, the computer 26 will produce a binary code representation of the remainder after the answer number has been divided by 55, the computer 27 will produce binary code signals representing the remainder after the answer number has been divided by 59 and so on, the computer 30 producing binary code signals representing the remainder after the answer number has been divided by 63. The output signals from the elementary computers 26 to 30 are applied to output buffer stores 31 to 35 from which they can be fed to a decoding arrangement represented in general by the block 36. The decoding arrangement, which will be described subsequently, produces an output binary code signal representing the answer number mentioned above, and will produce the correct answer even if an error is produced in the signals in any one of the modulus channels between the encoder and the decoder.

The encoding devices 11 to 15 may all be of identical construction, producing their different outputs only by reason of operating with respect to different moduli as will be explained. The arrangement shown in FIGURE 2 may therefore represent any one of the devices 11 to 15 but for convenience will be described as if it represented the device 11. The arrangement constitutes essentially a parallel binary multiplier having a multiplicand store 40, a multiplier store 41 and a product accumulating store 42. The stores 40, 41 and 42 each have six stages, represented by the small rectangles, since they may be required to accept binary coded signals representing numbers from 0 to 54. The orders of the stages in the stores 40 to 42 are indicated and the four lowest order stages of 40 can receive input signals from the four common output leads 43 of the buffer stores 5 to 9. All the stages of the store 40 can moreover receive input signals from the six output leads 44 of the accumulator store 42. The store 40 is normally insensitive to applied binary code signals but can be sensitised by a suitable "write" pulse applied via the multiplier store 41 which is called upon to store the only binary signal representing ten. That is the $2^1$ and $2^3$ stages are maintained in the condition representing one, all other stages being in the state representing zero. However six input leads 46 are shown connected to the respective stages of 41 so that the arrangement shown may be capable of use when required as part of the elementary computer 26 or even as part of the decoding device 36. The multiplicand store 40 has a transfer pulse input lead 47 and when a transfer pulse is applied to this lead, the binary coded signal stored in 40 is transferred to the accumulator store 42, and will be stored therein in a "write" pulse which is applied simultaneously to the lead 91. When the store 40 receives a transfer pulse 47, the resultant transfer is non-destructive and the store 40 preserves a record of the transferred information. However if a simultaneous pulse is applied via the lead 94 the transfer is destructive and the store is cleared. The accumulator store 42 has in turn an input lead 48, a pulse in which will cause the binary coded signal applied to 42 to be stored therein. The store 42 has also a transfer lead 91 a pulse in which will cause the signal stored in 42 to be transferred to the leads 44. If required the signal in 44 can be taken off at output terminals 49 or accepted by the store 40 if the latter receives a timely write pulse via lead 45. The accumulator store 42 has also a "shift left" lead 50 and a pulse on this lead causes a binary coded signal stored in 42 to be shifted one place to the left (that is multiplied by two). If such a shift produces a carry it appears as a pulse on the carry lead 51. The carry lead is connected to the input terminal of an inhibit gate 52, and the output terminal of this gate is connected in turn to a trigger circuit 53. Pulses produced by the trigger circuit are applied to an end element 54 which in known manner produces an output pulse on the occurrence of the trailing edge of each pulse produced by 53. Any pulses produced by the end element 54 are applied to the inhibiting terminal of an inhibit gate 55. Output leads from the stages of the multiplier store 41 are applied as shown to the first input terminals of a series of two gates 56 to 61, one for each stage of 41. The gates 56 to 61 are arranged to receive control pulses at their second input terminals from the stages of a ring counter 62. Output pulses from the gates 56 to 61 are applied to a trigger 63. The output of this trigger is applied in parallel to an inhibit gate 64 and a threshold-two gate 65, the arrangement being such that when the trigger 63 produces an output pulse the gate 64 is inhibited from transmitting pulses applied to its input terminal and the gate 65 is enabled to pass such pulses, the pulses being received from a delay element 66. The manipulation of binary code signals in the multiplicand store 40, the multiplier store 41 and the accumulator store 42 is controlled not only by the gates and triggers already described but also by additional components whose function will appear subsequently. These components comprise buffer gates 67, 68, 69 and 70, threshold-two gates 71, 72 and 73, an inhibit gate 92, single stage temporary stores 74 and 75, a two-stage shift register 76, triggers 77 and 78 and delay elements 79, 80 and 95. It will be noticed that the buffer gate 70 also has an inhibit terminal whereby transmission of pulses through the gate can be inhibited.

The arrangement further comprises a two-address store 81, each address having six stages. In order that the arrangement may be used as the encoder 11, one of the addresses 82 in the store 81 is employed to store permanently a binary code signal representing the difference btween sixty-four and fifty-five namely 001001 in binary code (the $2^5$ digit being first). This signal is called the filler and it will be noted that sixty-four is the modulus of six binary digits and that fifty-five is the desired channel modulus. The other address 83 of the store 81 has permanently stored in it the complement of the filler namely 110111, which is the binary code equivalent of fifty-five. The binary code signal in the address 82 can be transferred to the accumulator store 42 by means of a pulse in the lead 84 which comes from the first stage of the two-stage store 76. Similarly the binary code signal in the address 83 can be transferred to the accumulator store 42 by means of a pulse on the lead 85 which comes, via the inhibit gate 55, from the second stage of the two-stage store 76. The only special provision which has to be made in order to cause the arrangement illustrated in FIGURE 2 to operate as the encoder 11 is the storage in the address 82 of the filler appropriate to the modulus 55, and the storage in the address 83 of the complement of this filler. The encoder 12 differs from that illustrated only by having a different filler and a different complement in the addresses 82 and 83 the filler being five and the complement being fifty-nine and so on.

Figure 1:
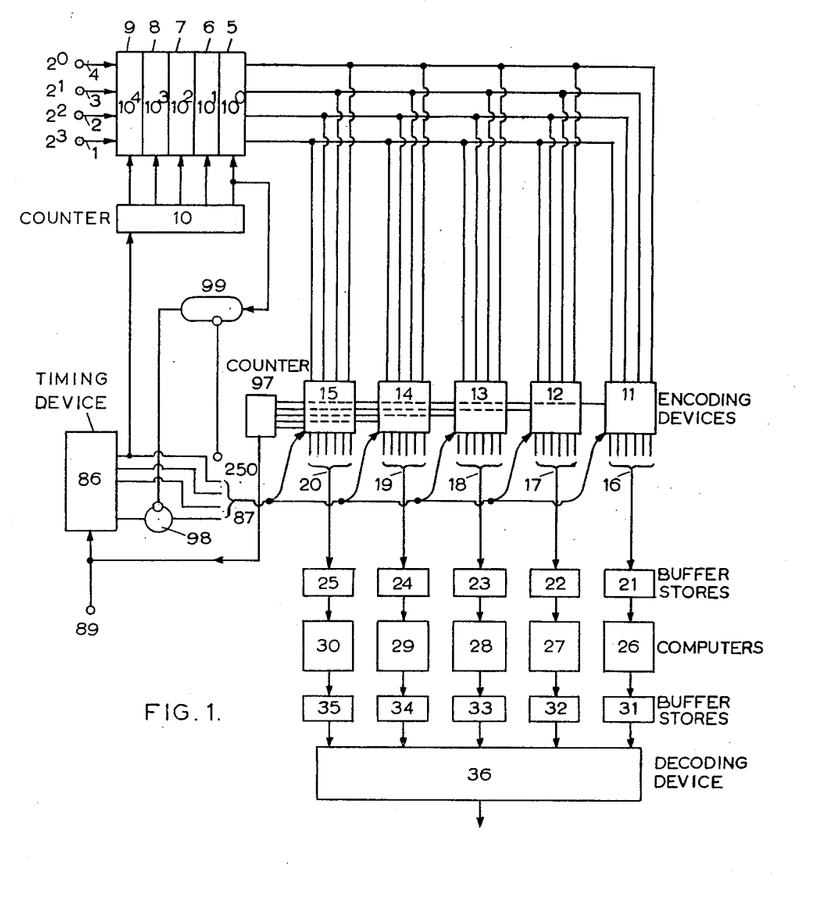
FIGURE 1 is a generalised block diagram of data handling apparatus according to one example of the present invention.
Figure 2:
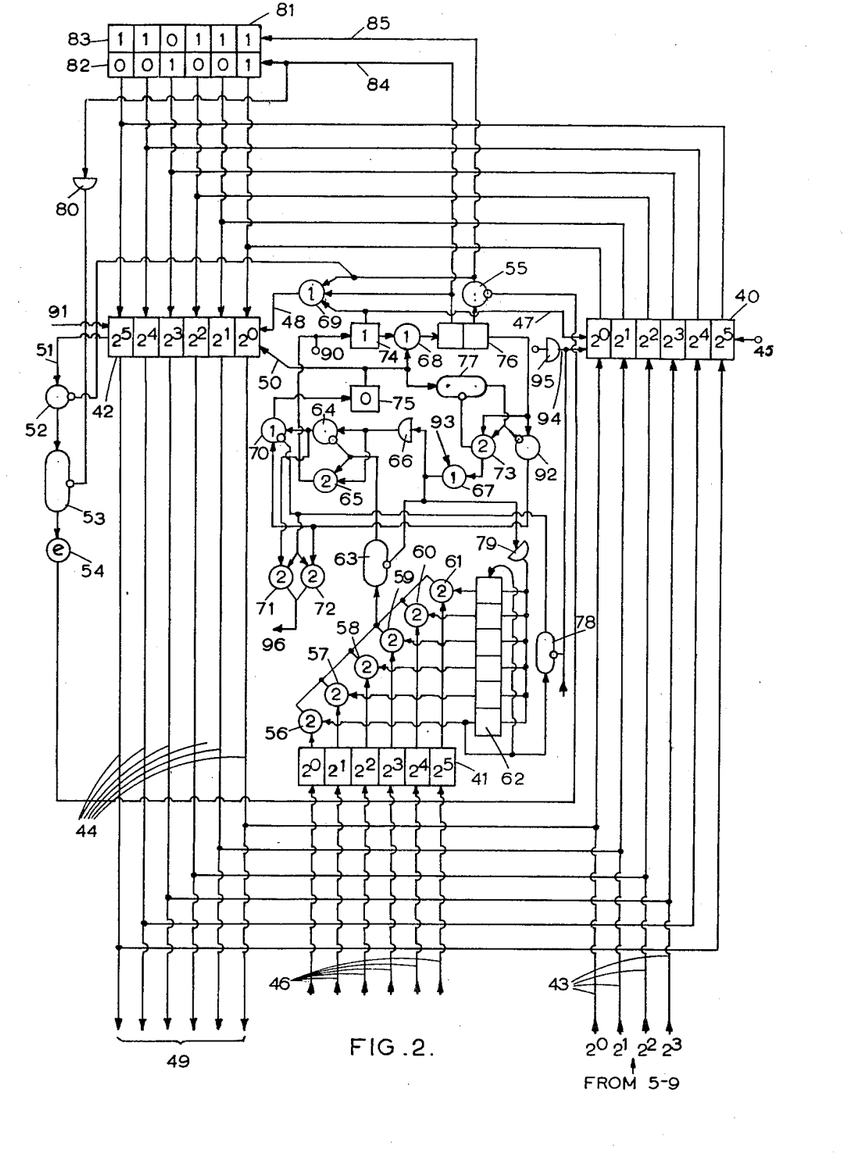
FIGURE 2 illustrates diagrammatically, and with the aid of conventional symbols, part of the apparatus shown in FIGURE 1, there being one part such as illustrated in FIGURE 2 in each remainder channel of the apparatus.

The timing of operations in the arrangement illustrated in FIGURE 2, and in all the other encoders 12 to 15, is effected by means of a timing unit represented by the rectangle 86 in FIGURE 1. The timing unit may consist simply of a pulse counter, arranged to count master clock pulses in well known manner and to have a counting cycle in which four pulses are produced on different output leads, with predetermined time intervals between them. After producing these four pulses, the timing unit then remains quiescent until it receives a new initiating pulse from the encoders 11 to 15. The leads on which the output pulses from the timing unit are indicated generally by the reference 87 in FIGURE 1 and as will be seen one lead is taken to the ring counter 10 whilst all four leads are taken to the encoders 11 to 15. The effect of the pulses on the leads 87 will appear subsequently. Master clock pulses are also applied as indicated to the one stage stores 74 and 75 and the two stage shift register 76.

All the components illustrated in FIGURE 2 have been represented by means of conventional symbols as in every case their construction follows conventional and well known techniques adopted in binary digital computers. The symbols are in accordance with those indicated in pages 53 to 55 of "Calculating Instruments and Machines," by Professor D. R. Hartree, published by The Cambridge University Press in 1950. The stages of the stores 40, 41, 42, 74, 75, 76 and 81 are constituted by magnetisable cores in well known manner and the various transfer control circuits are entirely conventional. The various gates and triggers are also constructed with the aid of magnetisable cores and the triggers are of the kind which have two stable conditions of equilibrium being switched to one of these states, usually termed the "1" state by the application of an input pulse to the terminal indicated by the arrow and are switched to the other state, the "0" state, by the application of a pulse to the terminal indicated by a small circle.

When it is desired to initiate an encoding operation on an input number, an initiating pulse is applied to a terminal 89 (FIGURE 1) and this initiates a cycle of the timing unit 86, there being one cycle for each decimal character, four cycles in all for one encoding operation. It is assumed that before a pulse is applied to the terminal 89, the input number to be encoded is already stored in the buffer stores 5 to 9. The first output pulse from the timing unit sensitises the first stage of the shift register 10 and transfers the binary code signal representing the $10^4$ character of the input number to the multiplicand store 40, the pulse which brings about the tranfser being also applied to the sensitising lead 45 of that store. The $10^4$ character from the buffer store 9 is also transferred, by the same action, to the multiplier stores in all the encoders, but for simplicity the description will be confined entirely to the encoder 11. The second pulse from the timing unit 86 appears at the terminal 90 and the input to the delay element 95. The pulse applied to 90 causes the one-stage temporary store 74 to be changed to the "1" state. The next clock pulse restores 74 to the "0" state and applies simultaneous pulses to the stores 40 and 42 via the leads 47 and 48. This transfers the contents of store 40 to store 42 the delayed pulse applied via 94 clearing the store 40 at this point. As the store 42 is an accumulator store, it would add the contents received from store 40 to anything previously stored in store 42. In the circumstances envisaged however, at the start of an encoding operation, the store 42 is initially empty and therefore after the transfer the store 42 contains merely the binary code signal representing the $10^4$ character of the number to be encoded. The third pulse from the timing unit 86 produces simultaneous pulses on the lead 45 of the store 40 and the lead 91 of the store 42 and transfers the contents of store 42 to store 40. In the present situation this merely re-transfers the $10^4$ character to the store 40.

The fourth and last pulse of the cycle of the timing unit 86 produces a series of operations which comprises six sub-cycles, one for each stage of the store 41. The said fourth pulse appears on the lead 93 and is transferred by the gate 67 to the delay elements 66 and 79 and also to the reset terminal of the trigger 63. This has the effect of restoring the trigger 63 to the "0" state if it is not already in that state. The delayed pulse from the element 79 enables the gate 61 to transmit the signal element stored in the $2^5$ stage of the multiplier store 41 to be applied to the trigger 63. In the present instance the signal in the $2^5$ stage of 41 represents zero and the trigger 63 remains in the "0" state. Therefore the gate 64 is not inhibited and the gate 65 is not enabled. The output of the delay element 66 therefore passes through the gate 64 and through the buffer gate 70 to change the one-stage temporary store 75 to the "1" state.

The subsequent clock pulse restores 75 to the "0" state and applies a pulse to the "shift left" lead 50 of the accumulator store 42, but since the store is empty the shift left pulse is without effect. When store 75 is restored to the "0" state, a pulse is also applied via the gate 68 to the two stage register 76 and to the trigger 77. The first stage of the store and the trigger are therefore changed to the "1" state. The next clock pulse transfers the "1" state from the first stage to the second of the store 76, and in so doing produces an output pulse from the first stage which is applied via the gate 69 to the lead 48 and also to the lead 84. This has the effect of transferring the filler from the address 82 to the accumulator store 42, and as the accumulator store 42 is empty before this transfer the contents of the store become equal to the filler. The next clock pulse restores the second stage of 76 to the "0" state and applies a pulse by way of gate 55 and lead 85 to the address 83 of store 81. The same pulse is applied via the gate 69 and lead 48 to the accumulator store 42 so that the complement of the filler is transferred from 83 to 42 and is added in the store 42 to the filler. All stages of the accumulator 42 are therefore changed to the "0" state and a carry pulse appears on the carry lead 51. However, this carry pulse cannot pass through the gate 52 because that gate is inhibited by the same output of the gate 55 as that which initiated the transfer from 83 to 42. The pulse produced when the second stage of 76 is restored to the "0" state is also applied to the gates 73 and 92. It will be recalled that the trigger 77 was changed to the "1" state because the binary digit zero was stored in the $2^5$ stage of 41. Moreover, because 77 is in the "1" state the gate 73 is enabled and the gate 92 is disabled and therefore the pulse from 76 passes through 73 and thence through the gate 67. This ends the first sub-cycle of the series and starts the second, independently on the appearance of a pulse from the master controller on the lead 93. Indeed the second step is the same as the first except that the second stage of the ring counter 62 is sensitised to enable the gate 60 (instead of the gate 61) so that the trigger 63 is caused to assume the condition corresponding to the binary digit in the $2^4$ stage of the multiplier store 41. As the multiplier is ten, the $2^4$ digit in 41 is zero as is the $2^5$ digit.

The ending of the second sub-cycle automatically starts the third, this time under the control of the $2^3$ digit stored in 41. However the $2^3$ digit has the value one and therefore when the gate 59 is enabled the trigger 63 is changed to the "1" state. This means that the gate 64 is disabled and the gate 65 is enabled. Therefore the pulse from the delay element 66 (which is, of course, the delayed pulse which caused the transfer of the $2^3$ digit to 63) passes through the gate 65 instead of 64 and changes the one-stage temporary store 74 to the "1" state, instead of the store 75. This change is the same as is produced by the second pulse from the timing unit 86. Therefore the sequence of operations described as having been initiated by the second pulse from 86 now takes place. Thus the contents of the multiplier register 40 (namely the $10^4$ character of the input number) is transferred to the accumulator store 42. The contents of the latter store before this last mentioned transfer being yet zero, no carry is produced on the lead 51 by the transfer. Next the filler is transferred from 82 to 42 and added to the $10^4$ digit of the input number. At this early point in the encoding procedure the addition of the filler will not produce a pulse in the carry lead 51 although it may do so subsequently in this or in subsequent cycles, since it will be realised that the effect of adding the filler to the contents of the accumulator store 42 is to cause the store to operate with respect to the modulus fifty five so that if, as a result of the addition, the contents of 42 would otherwise exceed 55, a carry is produced on 51 and the store 42 is changed to the state which corresponds to the storage of remainder produced by dividing by fifty-five the number in the store before the addition of the filler.

If no carry pulse appears at this point in sub-cycle three the next operation is the transfer of the complement of the filler from 83 to 42, this transfer being initiated when the second stage of 76 is changed to the "1" state as above described. It will be understood that the transfer of the complement of the filler to the store 42 has the effect of subtracting the filler and a carry pulse will be produced by this operation but that carry pulse is suppressed at the gate 52 by reason of the connection from the gate 55 to the inhibit terminal of 52. If, however, a carry pulse appears in 51 following the transfer of the contents of 40 to the store 42 and the addition of the filler, the carry pulse arranges the trigger 53 to state "1." That state is however maintained only until the pulse which initiates the addition of the filler reaches the trigger 53 and restores it to state "0." When this occurs the end element 54 produces a pulse which inhibits the gate 55 and the delay of 80 is such that the gate 55 is inhibited at the time when the second stage of 76 is changed to state "0." Thus the occurrence of a carry when the filler is added, inhibits the addition of the complement of the filler as is required if the operation of the accumulator is to be in accordance with modulus fifty-five. To trace the continuance of sub-cycle three it will be recalled that the pulse which tends to initiate the transfer from 83 to 42 is also applied to the gates 73 and 92. In the present instance however the trigger 77 has not been changed to the "1" state and therefore the pulse from the second state of 76 passes through 92 instead of 73 and proceeds via the gate 70 to the one-stage temporary store 75. The resetting of the stores 75 by the next clock pulse produces a "shift left" pulse in the lead 50 and shifts the contents of the accumulator store 52 one place to the left, in effect multiplying the contents of the store by two. The multiplication of the contents of the store by two may in some instances produce a carry in the lead 51 although not in the situation now being considered. This carry can pass through the gate 52 since it is not inhibited and changes the trigger 53 to the "1" state, being thus stored. The output of the one-stage temporary store 75 which produces the "shift left" pulse is also transferred to the two stage shift register 76. The next clock pulse thereafter then causes the filler to be transferred from the address 82 to the accumulator 42 in the manner described previously. The transfer of the filler to 42 also may or may not produce a carry in the lead 51, but it can be shown that if a carry has been produced by the immediately preceding "shift left" pulse no carry will be produced by the filler. Therefore after the "shift left" and the addition of the filler, the trigger 53 may or may not be in state "1" according as a carry is or is not produced by the "shift left" and filler-addition. If no carry has been produced during these two operations, the next clock pulse transfers the complement of the filler from the address 83 to the accumulator 42, in effect removing the filler from the accumulator. This operation will produce a carry but that carry is suppressed at the gate 52 as previously described. If on the other hand a carry has been produced either by the "shift left" or filler-addition, so that the trigger 53 has been changed to the "1" state, that trigger is restored to the "0" state by the same pulse as that which initiates the filler-addition, delayed in 80 however by one clock pulse period. The restoration of the trigger 53 to the "0" state causes the end element 54 to produce a pulse which inhibits the gate 55 at the time when the second stage of the shift register 76 produces an output pulse, so that the addition of the complement filler is suppressed. This is as required to cause the accumulator to operate with respect to the modulus fifty-five in the circumstance when a carry has been produced. The pulse which is applied to the gates 73 and 92 when the second stage of 76 is reset is not however inhibited by the output of the end element 54. This pulse in the present instance passes through the gate 73 and initiates the fourth of the series of six sub-cycles above referred to. During the third sub-cycle the $10^4$ character has been multiplied by two and the product retained in the accumulator 42, the operation having been performed with respect to the modulus fifty-five. The fourth sub-cycle is controlled by a signal stored in the $2^2$ stage of the multiplier store 41. This signal is zero and so the pulse from the gate 47 which initiates the fourth sub-cycle passes via 64 to the one stage store 75 and produces a "shift left" followed by the filler-addition and the conditional addition of the complement of the filler, depending upon whether or not "shift left" and filler addition produce a carry. At the end of sub-cycle four the number stored in the accumulator is the $10^4$ character of the input number multiplied by four.

Sub-cycle 5 is controlled by the signal in the $2^1$ stage of 41. As this signal represents one the pulse from 67 passes through 65 to the one stage store 74 and transfers the contents of 40 to the accumulator store 42, the transfer being followed as always, by the addition of the filler and the conditional addition of the complement of the filler. After the transfer, the contents of the accumulator store 42 represent the $10^4$ character multiplied by five, the result being expressed with respect to the modulus fifty-five. Sub-cycle 5 is then completed by the "shift left" procedure as a result of which the signal stored in the accumulator 42 becomes equal to ten times the $10^4$ character, the "shift left" procedure being followed by the addition of the filler and the conditional addition of the complement of the filler.

The resetting of the second stage of the register 76, which causes the conditional transfer of the complement of the filler from 83 to 42 initiates the sixth sub-cycle by applying a pulse through gates 73 and 67. This sub-cycle is controlled by the signal in the $2^0$ stage of 41, this signal being zero. However in this stage the "shift left" operation is inhibited because the output of the ring counter 62 enables the gate 56 and changes the trigger 78 to the "1" state thereby inhibiting the gate 70 and enabling the gates 71 and 72. Therefore the delayed pulse from 66 passes through the gate 64 and the gate 71 to produce an output pulse on the lead 96 indicating the end of the cycle, the end of cycle pulse (delayed if necessary) being also applied to the trigger 78 to restore it to the "0" state and being applied to the lead 94 to clear the store 40. The other encoders 12 to 15 produce end-of-cycle pulses in the same way and these are applied to a pulse counter 96. This counter has a modulus of five and when five pulses have been counted it applies a pulse to the terminal 89 and initiates the next cycle of the timing unit 86.

The second cycle of the timing unit 86 is initiated by a pulse applied to the ring counter 10 which causes the $10^3$ character to be transferred from the buffer store 8 to all the counters 11 to 15. In the case of the encoding device 11, the $10^3$ character is transferred to the store 40. The pulses from the timing device 86 then transfers the $10^3$ character from 40 to 42 and adds it to ten times the product of the $10^4$ character. The third pulse from the timing unit transfers the resultant in the accumulator 42 back to the multiplicand store 40. Thereupon the fourth pulse from the timing device 86 initiates the series of subcycles whereby the contents of the store 40 are multiplied by 10. At the end of the six sub-cycles, the resultant in the accumulator represents the $10^4$ character multiplied by $10^2$ plus the $10^3$ character multiplied by 10. In subsequent cycles of the timing device 86, the other tens characters are taken into account and successive multiplications by 10 take place until the $10^0$ character is transferred to the encoding device. The pulse from the ring counter 10 which initiates this transfer also causes the trigger 97 to be changed to the "1" state thereby inhibiting the gate 98 which is included in the output lead of the timing unit 86 which carries the fourth pulse of each cycle to the encoding devices. It will be understood that this inhibits the multiplication by 10 during this cycle. Consequently the operation of the encoding units is stopped at a time when there is present in the register 40, and in the corresponding register of the encoding devices 12 to 15, the remainder after dividing the input number by the modulus of the respective encoding device. The remainder is the required remainder because all operations in the encoding devices 11 to 15 are as described with respect to the appropriate modulus. When it is desired to transfer the remainders from the encoding devices to the buffer stores, a suitable pulse controlled by the programme is applied to the multiplicand stores in the encoding devices to transfer the contents thereof to the buffer stores 21 to 25. The same pulses applied to terminal 250 (FIGURE 1) may be used to reset the trigger 97 to the "0" state so that the buffer stores 5 to 9 and the encoding devices 11 to 15 may be conditioned for operating a subsequent input number.

Figure 3:
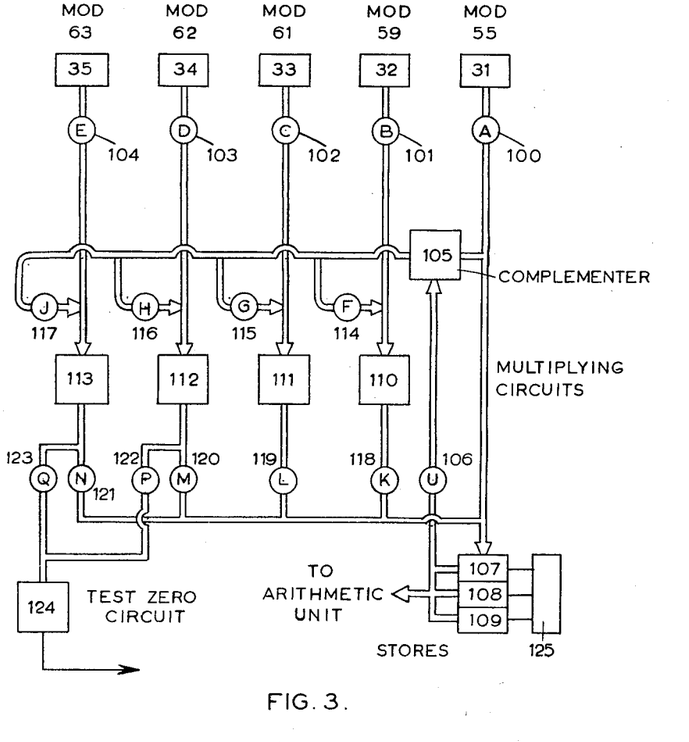
FIGURE 3 illustrates diagrammatically, and with the aid of conventional symbols, part of the decoding arrangement for decoding the output of the apparatus from remainder code into a more conventional code.
Figure 4:
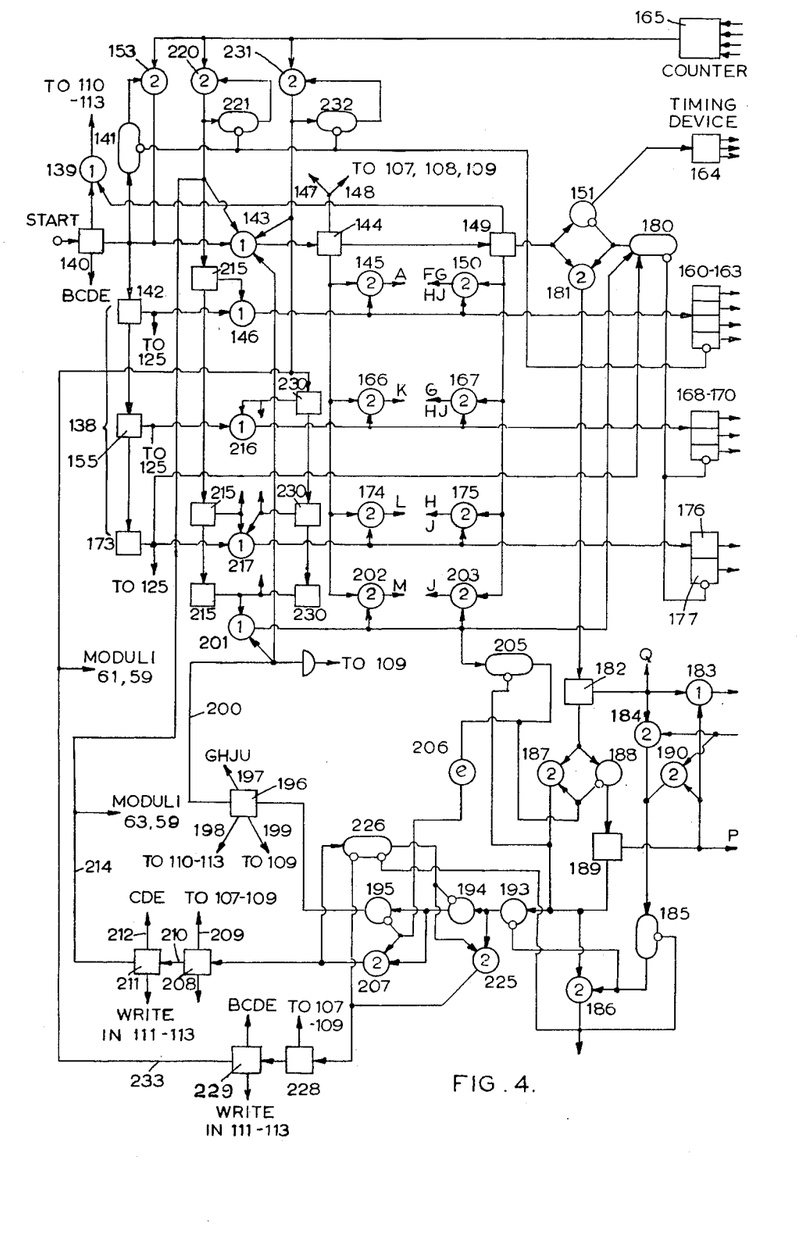
FIGURE 4 illustrates a timing device for use in conjunction with the decoding arrangement shown in FIGURE 3.

In FIGURE 3 the decoding arrangement 36 is represented in diagrammatic form and as shown in this figure the output channels of the buffer stores 31 to 35 are controlled by groups of gates 100–104. Only a single gate is shown for each modulus channel, but there are six such gates one for each binary character required to represent the remainder. The gates are moreover threshold-two gates which are enabled at appropriate times by pulses obtained from the timing unit which is shown separately in FIGURE 4. The six gates represented by 100 are all operated simultaneously by a single enabling pulse and similarly for the other groups of six gates.

In FIGURE 3 all multiple lead channels are for simplicity shown by double lines. The channel controlled by the gates 100 is applied to a complementer 105 and a series of three buffer stores 107, 108 and 109. The channels controlled by the gates 101, 102, 103 and 104 are applied respectively to multiplying circuits 110, 111, 112 and 113. The output of the complementer 105 is applied via groups of gates 114, 115, 116 and 117 to the circuits 110 to 113. The circuits 110 to 113 are all similar in construction to that shown in FIGURE 2 and in fact four of the multipliers in the encoding device may be used as necessary in the encoding arrangement to act as the multiplying circuits 110 to 113, under the control of the programme. The outputs of the multiplying circuits 110 to 113 are applied to groups of gates 118 to 123. The outputs of the gates 118, 119, 120 and 122 are applied to the buffer stores 107, 108 and 109, whilst the outputs of the gates 121 and 123 are applied to a test zero circuit 124. Transfer to and from the buffer stores 107 and 109 is controlled by a ring counter 125, the output leads of the buffer stores 107 to 109 being commoned and applied to an arithmetic unit which is not shown but will be mentioned subsequently. The common output of 107 to 109 is also applied via the group of gates 106 to the complementer 105. Reference characters A to Q and U are shown inside the symbols for the various groups of gates and these characters will be used to distinguish the pulses which are employed for enabling the groups of gates.

Before proceeding with the description of the operation of the decoding arrangement of FIGURE 3 and of the associated timing circuit the sequence of decoding which is employed will be indicated by the following example, the general method being due to Professor Svobada. Let the five remainders be $x_a$, $x_b$, $x_c$, $x_d$ and $x_e$ respectively and let the corresponding moduli be $a$, $b$, $c$, $d$ and $e$ respectively. The sequence comprises the following seven steps in the case of five remainders, and the sequence or a corresponding sequence for the case of a different number of remainders will be referred to herein and in the claims as "decode sequence."

(1) Subtract $x_a$ from the remainders in all the channels, let new remainders then be:

$$0 \quad y_b \quad y_c \quad y_d \quad y_e$$

(2) Divide the above by $a$ the modulus of the first channel and let the quotients be:

$$- \quad z_b \quad z_c \quad z_d \quad z_e$$

(3) Subtract $z_b$ from all the channels except $a$ and let the new remainders be:

$$- \quad 0 \quad p_c \quad p_d \quad p_e$$

(4) Divide the remainders (3) by $b$ and let the quotients be:

$$- \quad - \quad q_c \quad q_d \quad q_e$$

(5) Subtract $q_c$ from each of the above quotients to give the new remainders:

$$- \quad - \quad 0 \quad r_d \quad r_e$$

(6) Divide the remainders of (5) by $c$ to give the quotients:

$$- \quad - \quad - \quad s_d \quad s_e$$

(7) Subtract $s_d$ from the last two channels to give the remainders:

$$- \quad - \quad - \quad 0 \quad t_e$$

The number N expressed by the remainders $x_a$ to $x_e$ is then expressed by the following formula:

$$N = x_a + a(z_b + b(q_c + c(s_d + d(u_e))))$$
$$= x_a + a.z_b + a.b.q_c + a.b.c.s_d + a.b.c.d.u_e \ldots \quad (1)$$

In the application of this formula to the present invention use is made of the condition that any three of the remainders is sufficient to determine uniquely any number in the number field. This can be expressed by saying that N must be less than $a$, $b$, $c$ in which case $r_d$ and $r_e$ produced by step (5) above must be zero. That is $q_c$ must equal $q_d$ and $q_e$.

To start a decoding operation, a pulse is applied in response to the programme to the one stage temporary store 140. The next clock pulse which occurs, on restoring 140, causes a write pulse to be applied via the buffer gate 139 to the accumulator stores (corresponding to 42 of FIGURE 2) in each of the multiplying circuits 110 to 113. Simultaneously pulses are applied to the groups of gates BCDE. This causes the combination of stores 32 to be transferred to the accumulators in 110 to 113. The pulses produced in the restoration of 140 sets the trigger 141 to state "1," energises the first stage 142 of a three stage counter 138 and passes through the buffer gate 143, to the one stage temporary store 144. When the stage 142 is energised a pulse is applied to the counter 125 to cause it to apply an enabling pulse to the store 107. The next clock pulse, in restoring 144, sends a pulse through gate 145, which is enabled by 142 through buffer gate 146. The pulse through 145 opens the gate A, and transfers the contents of buffer store 31 to the complementer 105, a sensitising pulse being simultaneously applied to the complementer 105 via lead 147. Also a "write" pulse is applied to the group of stores 107 to 109 but as only the store 107 is enabled by the counter 125, the remainder stored in 31 is transferred to store 107. The pulse produced on restoration of the store 144 is also passed to the one stage store 149, which on being restored by the ensuing clock pulse, sends a pulse through the gate 150, which is enabled by 142, to the group of gates F, G, H and J. This applies the complement in 105 to the accumulator stores in 110 to 113, a "write" pulse being simultaneously applied to all the accumulator stores via the buffer gate 139. Therefore the complement of the remainder in the modulus fifty-five channel is added to the remainder in all other channels, which is the same as subtracting the remainder in the first channel from the remainders in all other channels. Of course the arithmetic in each case is performed with respect to the modulus of the respective channel, fifty-nine, sixty-one, sixty-two, or sixty-three as the case may be. Thus step one of the decode sequence is completed, $x_a$ having been subtracted from $x_b$, $x_c$, $x_d$ and $x_e$.

The next step is to divide the new remainders in the accumulators of 110 to 113 by the modulus of the first channel, namely fifty-five. This is achieved by multiplying the remainders by $\frac{1}{55}$ which is in fact a whole number when the quotient is expressed with respect to any one of the moduli of the channels two to five, the expression for the quotient being different for each channel as the moduli are different. The four required expressions are stored permanently in a series of stores 160 to 163 and the pulses produced when the stage 142 is energised is instrumental in transferring the respective expressions to the multiplier stores (corresponding to 41, FIGURE 2) of the circuits 110 to 113. The multiplication in the circuits 110 to 113 is initiated by the pulse produced on restoration of the one stage store 149 which starts a timing device 164. The timing device is a counter like 86 (in FIGURE 1) but sends out only three pulses in each cycle corresponding to the second, third and fourth of the pulses delivered by the timing device 86. The operations performed by these pulses are identical with those performed by the corresponding pulses from 86, in the various multiplying circuits, and will not therefore be further described. Moreover each multiplying circuit is arranged, as explained with reference to FIGURE 2, to send an output pulse when the respective multiplication has been finished. These output pulses are applied to a counter 165, which corresponds to 97 in FIGURE 1, and when the counter 165 has received the appropriate number of pulses from the multiplying circuits, it sends a pulse through the two-gate 153 which passes through the buffer gate 143 and also transfers the energisation to the second stage 172 of the counter 138. It will be recalled that the gate 153 has been enabled at the start of the encoding process by the trigger 141. The second of the seven steps in the decode sequence has now been completed and when the counter stage 142 is returned to de-energised, it sends a pulse to the stage 155 and energises that stage. Steps 3 and 4 are now performed by reason of the fact that the gates 166 and 167 are now enabled and the group of stores 168 to 170 are caused to transfer the appropriate multipliers to the multiplying circuits 111, 112 and 113. The multipliers in this case all represent $\frac{1}{59}$ but they are expressed with respect to the moduli 61, 62 and 63 respectively. During operation three it will be appreciated that the pulses produced by the gate 166 transfers the contents of the accumulator in the multiplier 110 to the complementer 105 and also to the store 108.

When steps three and four have been completed, step five is initiated in the manner already described by a pulse from 165, this pulse shifting the energisation of the counter 138 to the third stage 173 thereby enabling the gates 174 and 175, and supplying multipliers to the circuits 112 and 113 which represent respectively $\frac{1}{61}$. These multipliers are obtained from the stores 176 and 177, in which they are expressed respectively with respect to the moduli 62 and 63.

However it will be observed that there is an output from stage 173 of the counter 138 to the trigger 180 whereby this trigger is changed to state "1." This inhibits the gate 151 and enables the gate 181 so that the pulses which on restoration of 149 would otherwise start operation of the multipliers 112 and 113 is diverted through the gate 181 down to the one stage temporary store 182 so that, meantime at least, stage six is not performed. Considering the decode sequence, it will be observed that step 5 causes the result in this accumulator of 111 to be zero in any event, by reason of the decode sequence, but it should also cause zero to be stored in the accumulators of the multiplying circuits 112 and 113. This is so because, in the special condition of the invention, $q_c$ should equal $q_d$ and $q_e$ if there has been no malfunctioning in the channels of the apparatus. Therefore the next stage in the operation of the decoding equipment is to test for zero in the accumulators 112 and 113 and this is performed in response to the output pulse produced when the one stage store 182 is restored by the next clock pulse to occur after it has received a pulse through 181. When restoration of 182 occurs, a pulse is fed to the gates Q and, via buffer gate 183, to the test zero circuit 184 to cause that circuit to test the contents of the accumulator store in the circuit 113. The same pulse which initiates the test enables the gate 184 and if the test indicates that the contents of the accumulator in 113 equal zero, an output pulse is obtained from the test circuit which passes through 184, and changes the trigger 185 to the "1" state. The construction of the test zero circuit has not been indicated as this may be any one of a variety of forms which are well known to those skilled in the art. If the trigger circuit 185 is changed to state "1" it enables the gate 186.

The pulse produced by the restoration of 182 is also applied in parallel to the threshold-two gate 187 and to the inhibit gate 188. In the present stage of the decoding operation, 187 is not enabled and 188 is not inhibited and therefore the pulse in question is applied to the one stage store 189. This store is subsequently restored by a clock pulse sending a pulse to the buffer gate 183 and the threshold-two gate 110, where circuit 124 is caused to test the contents of the accumulator 112 for zero, exactly as was done in the case 113. If zero is found in the accumulator of 112 a pulse is received through the gate 190 which tends to set the trigger 185 in state "1," if it is not already in that state. Consequently if zero is found in the accumulator of either 112 or 113 the trigger 185 is changed to state "1" and the gate 186 is enabled. A suitable warning signal may be given if either operations of the test zero circuit fail to find zero, the warning indicating which of the multipliers 112 or 113 has failed to pass the test thereby indicating that one or other of the two corresponding channels is functioning incorrectly. However if either of the test zero operations is successful, the correct output number from the apparatus can be derived directly on the basis of the three quantities contained in the stores 107, 108 and 109, and from a knowledge of the moduli of the first two channels, namely 55 and 59. The signal output from the gate 186 can therefore be arranged to initiate operation of a computer so as to reconstitute the correct output number in binary, or binary decimal code form as may be desired. As this computer may be entirely conventional, it will not be described, in order that the present description shall not be unnecessarily lengthened. Basically the required computer would be a multiplier for evaluating the first of three terms of Equation 1 above and any of the multiplying circuits contained in other parts of the apparatus can be used for this purpose, under the control of the programme. The only requirement is that the multiplying circuit will operate with respect to a modulus at least equal to the total capacity of numbers in the number field.

If neither of the tests for zero are successful, this indicates that one of the first three channels (with moduli 55, 59 or 61) is functioning incorrectly and the encoding apparatus is then caused to perform one or two further decode sequences omitting first one and then a second of these three channels. Thus if the trigger 185 is not changed to state "1," the gate 186 is not enabled, and an inhibit gate 193 is not inhibited. Therefore the pulse produced on the restoration of 189 passes through the gate 193, and passes through two inhibit gates 194 and 195 (neither of which being inhibited) to the one stage temporary store 196. This store is reset by the next clock pulse to occur and produces outputs on different leads as indicated. The output on the lead 197 opens the group of gates G, H, J and U. The output on the lead 198 sensitises the accumulators in the multiplying circuits 110 to 113, and the output lead 199 sends a transfer pulse to the store 109. This group of operations causes the contents of 109 to be added to the accumulators in 111, 112 and 113. Referring to the table above, it will be seen that the contents of the store 109 at this stage represent $q_c$ and therefore the result of the operation is to restore the accumulators in 111, 112 and 113 to their condition at the end of step 4, bearing in mind that in this case, because of malfunctioning in one of the first three channels, $q_c$, $q_d$ and $q_e$ are not equal. The fourth output lead 200 from the store 196 sends a pulse through the buffer gate 143 and energises the one stage store 144. This pulse also passes through a suitable delay network and after delay is sent as a sensitising pulse to the store 109. The pulse on the lead 200 also passes through the buffer gate 201 and enables the gates 202 and 203. Consequently when the store 144 is restored by the next clock pulse, the gates M and the gates J are enabled, so that the contents of the accumulator in the multiplier 112 are transferred to the store 109 and also to the complementer 105, the output of the complementer being in turn transferred to the accumulator in the multiplying circuit 113. This in effect comprises stage 7 of the decode sequence, steps 5 and 6 having been omitted, the quantity $q_d$ being however subtracted instead of the quantity $s_d$ in the table. The pulse proceeding through the gate 201 sets the trigger 180 in state "1" and so enables the gate 181. Therefore when an output pulse is produced by 149, that pulse instead of passing through 151 to initiate a multiplying operation passes through 181 to the control elements for the test zero circuit and the circuit 124 is caused to test the quantity accumulated in 113 for zero. The trigger 185 will again be set in state "1" if the test is successful but otherwise remains in state zero. It will also be noted that in this case the gate 183 is inhibited and the gate 187 is enabled by the trigger circuit 205 so that the output pulse from 182 which initiates the test on the contents of the accumulator in 113 does not pass to 193 to initiate a subsequent test of the contents of the accumulator in 112. Instead the respective pulse is passed from 187 to the gates 186 and 193 passing through 186 if the test is successful and otherwise passing through 193. The pulse through 187 also restores the trigger 205 and the end element 206 then sends a pulse to the gates 195 and 207 inhibiting the former and enabling the latter. Therefore if the test is unsuccessful the pulse from 193 passes through 207 and is stored in the one stage store 208.

When the store 208 is cleared by a subsequent clock pulse, it produces an output pulse on the leads 209 and 210. The output pulse on 209 is applied to the stores 107, 108, 109 to clear these stores and is also applied to the accumulators in the multipliers 110 to 113 to clear all the accumulators. The pulse on the lead 210 is stored in a one stage store 211. This is restored by a subsequent clock pulse and pulses are produced in leads 212, 213 and 214. The pulses on the lead 212 enables the gates 102, 103 and 104 and the pulse on 213 conditions the accumulators in the multiplying circuits to accept an input number. Consequently the remainders in the buffer stores 33, 34 and 35 are transferred to the accumulators in 111, 112 and 113. The pulse on 214 passes through the buffer gate 143 to the one stage store 144 and also energises the first stage of the three stage counter 215 which is similar to 138 except that its second stage has an output to buffer gate 217 instead of buffer gate 216 and its third stage has an output to 201 instead of 217. This conditions the apparatus to carry out the decode sequence once more, this time without regard to the remainder signal in the channel with modulus 59 that is in the second channel. In other words the decode sequence now comprises steps 1, 2, 4, 5, 6 and 7. In this case recycling pulses transmitted from the counter 165 are passed to the counter 216 through the gate 220 (and not gate 153) because that gate is enabled by the trigger 221 having been set in the "1" state by the pulse in the lead 214.

After step 7 in the new decode sequence, the zero test is again performed in respect of the contents in the accumulator in the multiplier 113 and if the test is successful, an output from 186 is employed as before to reconstitute the output number on the basis of the numbers now stored in 107, 108 and 109. An output is also taken from the lead 214 to the accumulator to indicate that reconstitution should be effected on the basis of the moduli 65 and 59 respectively.

If the test for zero is still unsuccessful, the pulse through the gate 193 is now passed through the gate 225 instead of the gate 194. This arises because the gate 194 is inhibited by the trigger 226 whereas the gate 225 is enabled thereby, the trigger having been set in state "1" by the previous output from the gate 207. The pulse from 225 is passed to the store 228 and pulses produced when 228 is restored clear the accumulators in the multiplying circuits, clears the stores 107 to 109 and energise the one stage store 229. This store corresponds to 211 but causes the decode sequence now to be performed omitting the remainder signal from the channel of the modulus 55 that is omitting steps 1 and 2 of the decode table. The decode sequence is performed in this case under the control of the three stage counter 230 and successive cycles being initiated when a pulse is received from 165 through the two gate 231 which is enabled when the trigger 232 is set in state "1" by the pulse in the output lead 233 from the store 239. The invention is based on the assumption that only one channel will be incorrect at any one time and therefore the test for zero carried out on the end of this new decode system should be successful, so that the output number can be reconstituted on the basis of the quantities now stored in 107 and 109, a signal being obtained from the lead 233 indicating that the reconstitution should be effected on the basis of the moduli 61 and 59.

Many variations may be made in the details of the apparatus described. It is obvious moreover that much of the equipment described is duplicated in various parts of the apparatus, and may, if desired be commoned. For example control circuits in the various multiplier circuits may be commoned and moreover individual multipliers may, as already indicated, be used for several different functions, under the control of the programme.

Furthermore while it is preferred to use two channels in excess of the number required to determine uniquely any number in the number field of the apparatus only a single "redundant" channel may be used, some other expedient being then employed to indicate which of the channels is functioning incorrectly in the event that the decode sequence indicates that an error has occurred. The other expedient may for example consist of the provision in each channel of a parity check, if the invention is applied in a situation in which the validity of a parity check is not destroyed during the handling of the information. Alternatively remainder check digits may be employed in each channel to indicate if any one channel is functioning incorrectly.

Moreover it is obvious that series or parallel mode operation may be interchanged and that different forms of multiplier and control circuits may be used. Moreover instead of providing special encoding and decoding circuits, a store may be provided from which there may be derived the remainder code equivalents of any number liable to arise in the handling process.

The reference in the claims to numbers which are relatively prime is intended to include numbers which are multiples of relatively prime numbers. The employment of multiples does not initiate the encoding and decoding processes, although it introduces some redundancy in the modulus channels.

What I claim is:

1. Information handling apparatus adapted for handling numbers within a given number field, comprising input means responsive to an input number for providing a plurality of remainder signals each of which represents the remainder after division of the input number by a divisor, and each divisor being prime relatively to every other divisor, the number of remainder signals being greater than the number sufficient to determine uniquely any number in said number field so that at least one of said remainder signals is redundant, means responsive to said signals to provide a plurality of output remainder signals equal in number to said input remainder signals and representing a number in said number field, and means for decoding said output remainder signals to indicate the number represented thereby, said decoding means including means responsive to a redundant remainder signal for detecting an incorrect output remainder signal and for producing said indication without regard to such incorrect output remainder signal.

2. Apparatus according to claim 1 wherein said means for providing the remainder signals which represent said input number is arranged to provide two remainder signals in excess of the number which is sufficient to determine uniquely any number in said number field, and the decoding means comprises testing means responsive to different combinations of said output remainder signals each combination having that number of remainder signals sufficient to determine uniquely any number in said number field, to select two combinations which determine the same number in said number field, thereby to indicate the correct output number.

3. Apparatus according to claim 2 wherein said testing means includes means for performing successive steps in accordance with the decode sequence hereinbefore described in order to eliminate successive output remainder signals, and means for discontinuing the steps of the signals when the non-eliminated remainder signals are all zero.

4. Apparatus according to claim 3 wherein said input means is adapted to respond to a signal representing an input number, expressed in a series of characters of higher than binary scale, and comprises a plurality of encoding means for separately converting said signal into binary code, said plurality of encoding means being arranged to operate respectively to moduli equal to said divisors.

References Cited in the file of this patent
UNITED STATES PATENTS 2,919,854   Singman ________________ Jan. 5, 1960
2,969,912   Reynolds _______________ Jan. 31, 1961